(12) United States Patent
Furuya

(10) Patent No.: US 10,219,497 B2
(45) Date of Patent: Mar. 5, 2019

(54) FISH COLLECTING DEVICE

(71) Applicant: Globeride, Inc., Tokyo (JP)

(72) Inventor: Hideyuki Furuya, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 218 days.

(21) Appl. No.: 14/826,474

(22) Filed: Aug. 14, 2015

(65) Prior Publication Data

US 2016/0057983 A1    Mar. 3, 2016

(30) Foreign Application Priority Data

Aug. 29, 2014 (JP) ................................ 2014-176160
Jul. 10, 2015 (JP) ................................ 2015-138886

(51) Int. Cl.
*A01K 85/12* (2006.01)

(52) U.S. Cl.
CPC .................................... *A01K 85/12* (2013.01)

(58) Field of Classification Search
CPC ......... A01K 85/10; A01K 85/12; A01K 85/14
USPC ............. 43/42.03, 42.19, 42.23, 42.36, 42.5
See application file for complete search history.

(56) References Cited

U.S. PATENT DOCUMENTS

| | | | |
|---|---|---|---|
| 1,606,176 A | 11/1926 | Paulson | |
| 1,946,641 A * | 2/1934 | Sisco .................... | A01K 85/14 |
| | | | 43/42.12 |
| 3,529,376 A * | 9/1970 | Parmeson ............. | A01K 85/00 |
| | | | 43/42.06 |
| 3,789,536 A * | 2/1974 | Parmeson ............. | A01K 85/00 |
| | | | 43/42.05 |
| 4,201,008 A | 5/1980 | Sparkman | |
| 4,569,147 A | 2/1986 | Margulis | |
| 5,090,151 A * | 2/1992 | Salminen ............. | A01K 85/00 |
| | | | 43/42.05 |

(Continued)

FOREIGN PATENT DOCUMENTS

| | | | |
|---|---|---|---|
| JP | 11289920 A | * | 10/1999 |
| JP | H11-289920 | | 10/1999 |
| JP | 2003-061519 A | | 3/2003 |

OTHER PUBLICATIONS

Communication Pursuant to Article 94(3) EPC EP Application No. 15 182 559.3 dated Jun. 2, 2017.

(Continued)

*Primary Examiner* — Lisa L Tsang
(74) *Attorney, Agent, or Firm* — Pillsbury Winthrop Shaw Pittman, LLP

(57) ABSTRACT

One object is to provide a fish collecting device having a simple structure whereby free rotation of a propeller is prevented in casting, and the propeller can rotate freely under water. The propeller body is formed of one metal plate or an integral resin mold; a front end stopper and a rear end stopper are formed of bent or projected parts of the propeller body at the front end and rear end of the propeller body, and a rotary shaft, inserted through holes formed in the front end stopper and the rear end stopper, has a rotation restricting portion for contacting the propeller body. Free rotation of the propeller body in casting can be restricted by a simple structure wherein the rotation restricting portion contacts the propeller body and the rotary shaft engages with the propeller body such that the propeller body is unrotatable with respect to the rotary shaft.

4 Claims, 20 Drawing Sheets

(56) References Cited

U.S. PATENT DOCUMENTS

| | | | |
|---|---|---|---|
| 2008/0000141 A1* | 1/2008 | Hair | A01K 85/01 43/42.14 |
| 2010/0126058 A1* | 5/2010 | Hughes | A01K 85/16 43/42.39 |
| 2010/0263258 A1 | 10/2010 | Hinz | |
| 2014/0068997 A1* | 3/2014 | Choi | A01K 85/01 43/42.33 |

OTHER PUBLICATIONS

Extended European Search Report dated Jan. 14, 2016 for Appln. No. 15182559.3.
Office Action Chinese Patent Application No. 201510522689.9 dated Sep. 1, 2017 with full English translation.
Office Action for Japanese Patent Application No. 2015-138886 dated Jun. 7, 2018 with English translation.
Office Action Korean Patent Application No. 10-2015-0113658 dated Apr. 19, 2018 with English translation.
Notice of Final Rejection Korean Patent Application No. 10-2015-0113658 dated Dec. 27, 2018 with English translation.

* cited by examiner

FISH COLLECTING DEVICE

CROSS-REFERENCE TO RELATED APPLICATIONS

This application is based on and claims the benefit of priority from Japanese Patent Application Serial No. 2014-176160 (filed on Aug. 29, 2014) and Japanese Patent Application Serial No. 2015-138886 (filed on Jul. 10, 2015), the contents of which are hereby incorporated by reference in their entirety.

TECHNICAL FIELD

The present invention relates to a fish collecting device having a rotator (generally called a propeller) that rotates in and on the water for collecting fishes.

BACKGROUND

There have conventionally been provided as fishing gears fish collecting devices having a propeller that rotates in and on the water. The propeller rotating in the water produces a special sonic or visual stimulus that lures curious fishes.

Fish collecting devices having a propeller are represented by a buzz bait lure. A typical shape of a buzz bait lure includes a metal arm having a dogleg shape, a head portion shaped similar to a fish head provided on one end of the arm and a hook provided on the head portion, and a propeller portion provided on the other end of the arm (see FIGS. 12*a* and 12*b*).

Such a buzz bait lure is cast in a position with its propeller portion and its head portion (the rear side of the lure) oriented to the casting direction and, after the lure enters the water, the fish line is drawn (wound) while the lure moves in the water with its one end of the arm (the front side of the lure) on which the fish line is locked oriented forward. The propeller portion rotates by receiving resistance of water in the direction of movement, producing peculiar sound and appearance that lure curious fishes.

However, in casting the fish collecting device having the propeller, the propeller may rotate freely in the air and produce a large resistance, resulting in smaller casting distance. There have been provided fish collecting devices that prevent free rotation of the propeller in casting. For example, Japanese Patent Application Publication No. Hei 11-289920 (the "'920 Publication") discloses that, as shown in FIGS. 12*a* and 12*b*, a hemispheric adapter (11) is provided on an arm (1) in front of a propeller body (2) movable in the axial direction of the arm (1); and when the propeller body moves forward (to the left of the figure), a projection in the adapter (11) is engaged with a cavity in the propeller body, thereby preventing free rotation of the propeller with respect to the arm (1) in casting.

However, due to a large impact received when the lure enters the water, the technique disclosed in the '920 Publication suffers the problem of breakage of the adapter (11) caused by the impact. If the adapter (11) is formed of a robust metal member that is less vulnerable to breakage, increase of its weight reduces the casting distance.

The technique disclosed in the '920 Publication also suffers a problem that the adapter (11) tends to be caught on floating objects in and on the water.

Further, the '920 Publication also discloses a technique using no adapter, but the propeller body has a complex structure and suffers problems of manufacturing costs and fabrication labors.

SUMMARY

The present invention is intended to provide a fish collecting device with a propeller that has a simple structure but can prevent free rotation of the propeller with respect to the rotary shaft in casting and allow free rotation of the propeller in the water. The reason that the excess rotation of the propeller reduces casting distance is the same as with a golf ball. Although adequate rotation is necessary to maintain a direction, rotation higher than that produces a large resistance and reduces the casting distance. Therefore, it is necessary to restrict free rotation of the propeller with respect to the rotary shaft in casting. Since the lure is attached to the fish line, the lure rotates to some extent due to the window received by the propeller, thereby maintaining its direction.

The prevent invention, which is intended to overcome the above problems of the related art, provides a fish collecting device comprising: a propeller body including: one or more rotary wings; a front end stopper formed at a front end of the propeller body and having a hole; and a rear end stopper formed at a rear end of the propeller body and having a hole, and a rotary shaft inserted through the holes and supporting the propeller body so as to be rotatable and movable in an axial direction, the rotary shaft including a rotation restricting portion for contacting the propeller body, wherein the propeller body and the rotary shaft relatively move between a first arrangement in which the propeller body freely rotates with respect to the rotary shaft and a second arrangement in which the rotation restricting portion contacts the propeller body and the rotary shaft is engaged with the propeller body such that the propeller body is unrotatable with respect to the rotary shaft.

The present invention also provides a fish collecting device comprising: a propeller body formed of one metal plate, including: one or more rotary wings; a front end stopper formed of a bent part of the metal plate at a front end of the propeller body and having a hole; and a rear end stopper formed of a bent part of the metal plate at a rear end of the propeller body and having a hole, and a rotary shaft inserted through the holes and supporting the propeller body so as to be rotatable and movable in an axial direction, the rotary shaft including: a rotation restricting portion for contacting the propeller body, wherein the propeller body and the rotary shaft relatively move between a first arrangement in which the propeller body freely rotates with respect to the rotary shaft and a second arrangement in which the rotation restricting portion contacts the propeller body and the rotary shaft is engaged with the propeller body such that the propeller body is unrotatable with respect to the rotary shaft.

Further, the present invention provides a fish collecting device comprising: a propeller body formed of an integral resin mold, including: one or more rotary wings; a front end stopper projected from a front end of the propeller body and having a hole; and a rear end stopper projected from a rear end of the propeller body and having a hole, and a rotary shaft inserted through the holes and supporting the propeller body so as to be rotatable and movable in an axial direction, the rotary shaft including: a rotation restricting portion for contacting the propeller body, wherein the propeller body and the rotary shaft relatively move between a first arrangement in which the propeller body freely rotates with respect to the rotary shaft and a second arrangement in which the rotation restricting portion contacts the propeller body and the rotary shaft is engaged with the propeller body such that the propeller body is unrotatable with respect to the rotary shaft.

The present invention provides a fish collecting device that has a simple structure wherein a propeller body is formed of one metal plate but can securely prevent free rotation of the propeller with respect to the rotary shaft in casting and allow free smooth rotation of the propeller in the water.

The present invention also provides a fish collecting device that has a simple structure wherein a propeller body is integrally formed of a resin mold but can securely prevent free rotation of the propeller with respect to the rotary shaft in casting and allow free smooth rotation of the propeller in the water.

DESCRIPTION OF EXAMPLE EMBODIMENTS

Figure 12A:
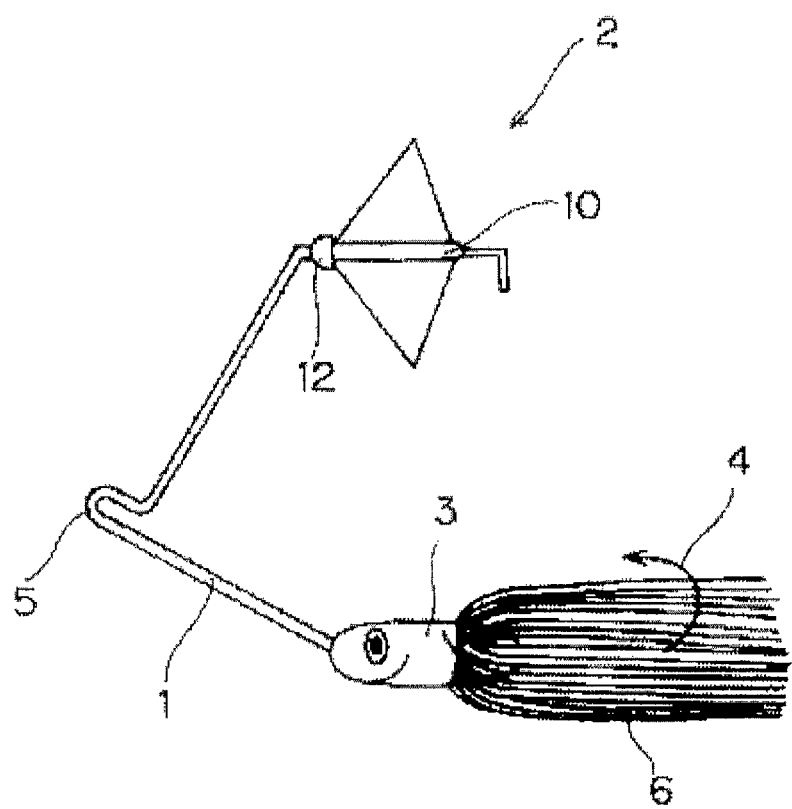
FIG. 12a shows a related art.
Figure 12B:
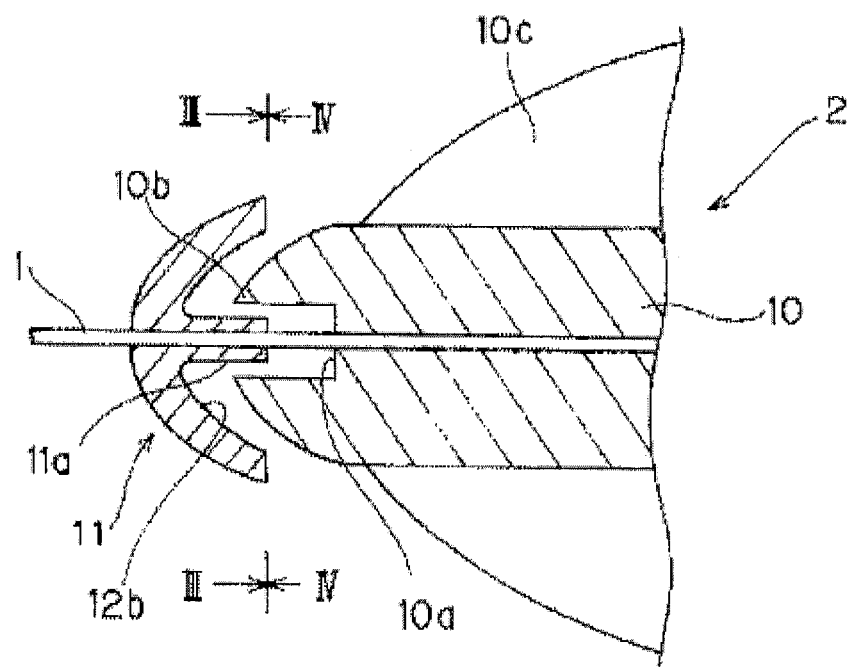
FIG. 12b shows a related art.

Embodiments of the present invention will now be described in detail with reference to the drawings. The embodiments described below have exemplary structures wherein a propeller body and a lure is sequentially arranged in one axis, instead of the structures as in the related arts shown in FIGS. 12a and 12b wherein an arm is bent into a dogleg shape, and on one side the arm is provided a propeller body and on the other side thereof is provided a lure. However, it is natural that the present invention can be applied to the propeller body provided on one side of the arm bent into a dogleg shape in the related arts.

Figure 1A:
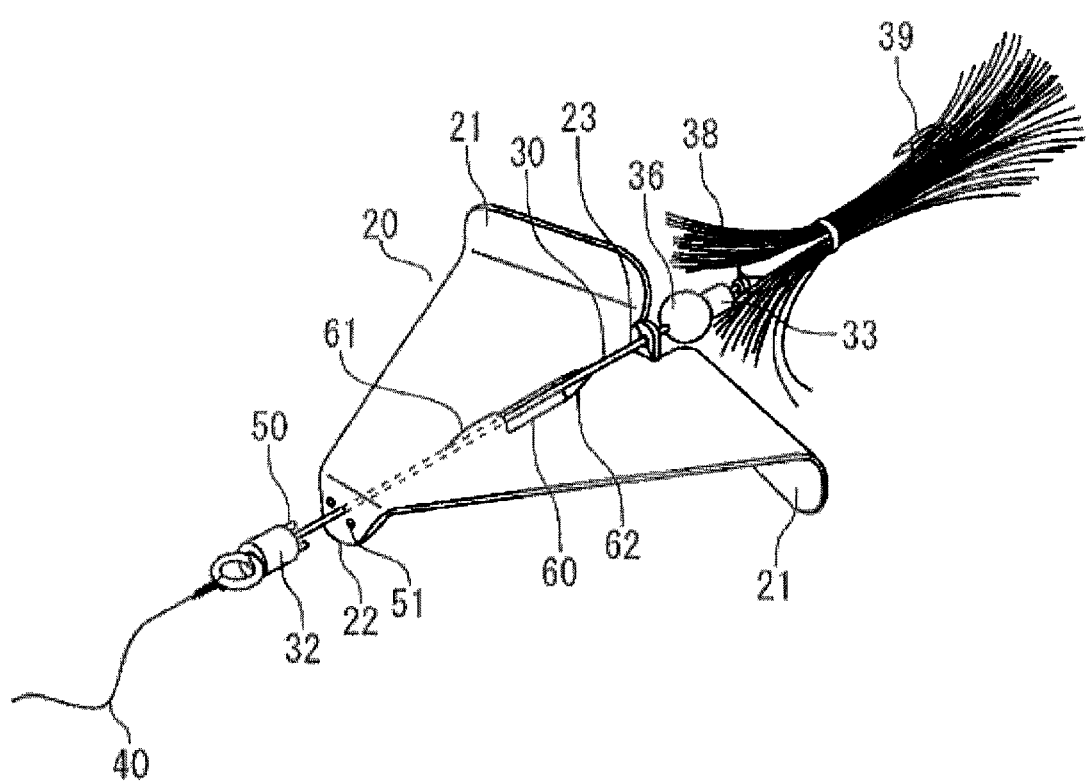
FIG. 1a is a perspective view of a first embodiment of the present invention.
Figure 1B:
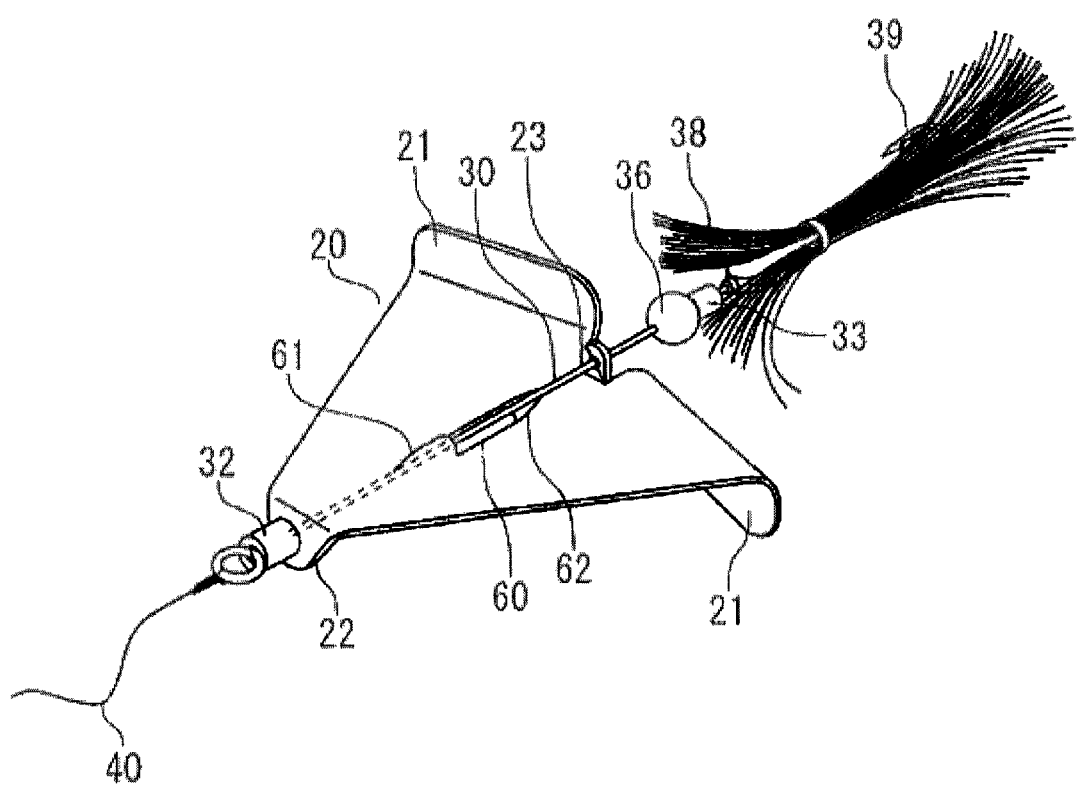
FIG. 1b is a perspective view of the first embodiment of the present invention.

FIGS. 1 to 3 show the first embodiment of the present invention. The propeller body 20 may have an almost triangular outer shape and may be formed of one metal plate, wherein parts of the left and right rear ends are bent to form rotary wings 21, and parts of the front end and the rear end are bent to form a front end stopper 22 and a rear end stopper 23, respectively, both stoppers having a hole formed therein for insertion of a rotary shaft 30.

As shown, the front end stopper 22 and the rear end stopper 23 may be bent in opposite directions separated by 180°, and the rotary shaft 30 may extend through an elongated hole 60 formed in the middle portion of the propeller body 20 so as to obliquely extend across (through) the propeller body 20 in a lateral view.

The propeller body 20 can rotate with respect to the rotary shaft 30 and is supported so as to be movable in the axial direction of the rotary shaft 30. The rotary shaft 30 may be arranged so as to obliquely extend across the propeller body 20 in a plane view in order to maintain the overall balance. It may also be possible that the front end stopper 22 and the rear end stopper 23 be bent in the same direction and the rotary shaft 30 extend in parallel with the plane of the propeller body 20.

The front end stopper 22 may have holes 51 to be engaged with projections 50 of the rotation restricting portion 32 (described later) provided on the rotary shaft 30. When the projections 50 and the holes 51 are engaged with each other, the propeller body 20 may be restricted from free rotation with respect to the rotary shaft 30. The first embodiment may include two projections 50 and two holes 51; but the number of these elements may also be one, three, or larger.

The rotary shaft 30 may be formed of one piece of wire or one metal rod. On one end thereof may be provided a fish line connecting portion for connecting the fish line 40. The above-mentioned rotation restricting portion 32 is fixed so as to connect to the fish line connecting portion. The first stopper 33 may be fixed on the other end side, and a spherical spacer 36 may mediate between the first stopper 33 and the propeller body 20 so as to smoothen the rotation of the propeller body 20. The spacer 36 may be optional.

The elongated hole 60 formed in the middle portion of the propeller body 20 may have such a length that the rotary shaft 30 can move obliquely across (through) the propeller body 20 in a plane view and the rotary shaft 30 and the propeller body 20 do not contact with each other. Additionally, axially before and behind the elongated hole 60 may be provided cavities 61, 62, respectively, for receiving a part of the rotary shaft 30. The cavities 61, 62 may be formed by pressing. When the elongated hole 60 has a sufficient length, the cavities 61, 62 are not necessary; and the cavities 61, 62 may be replaced with the front and rear ends of the elongated hole 60 formed in sloped surfaces. The numeral 39 denotes a hook, and the numeral 38 denotes a skirt for hiding the hook.

Figure 2A:
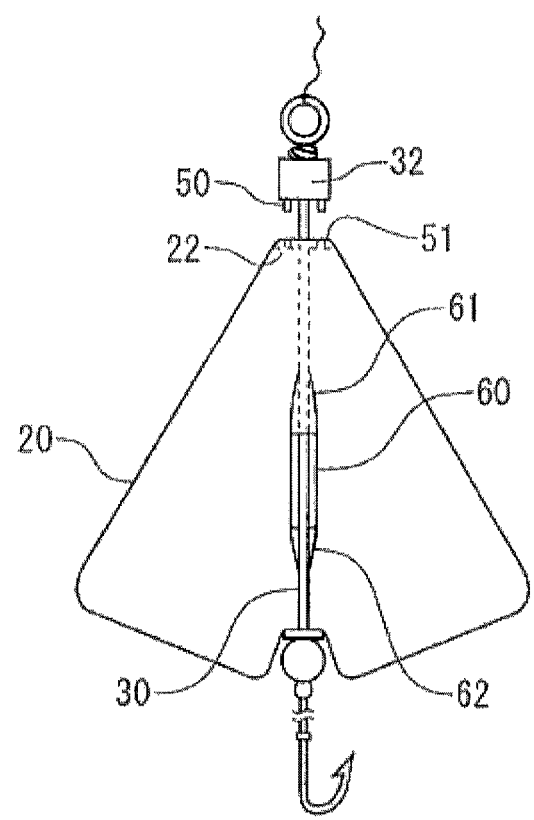
FIG. 2a is a plain view of the first embodiment of the present invention.

The operation of the fish collecting device according to this embodiment described above will now be described. First, when an angler holds a fishing rod for fishing, the fish line and the fish collecting device hang down in accordance with the gravity. As shown in FIG. 2a, the propeller body 20 and the rotary shaft 30 of the fish collecting device may be in a first positional relationship (the first arrangement) wherein the propeller body 20 can freely rotate with respect to the rotary shaft 30.

Figure 2B:
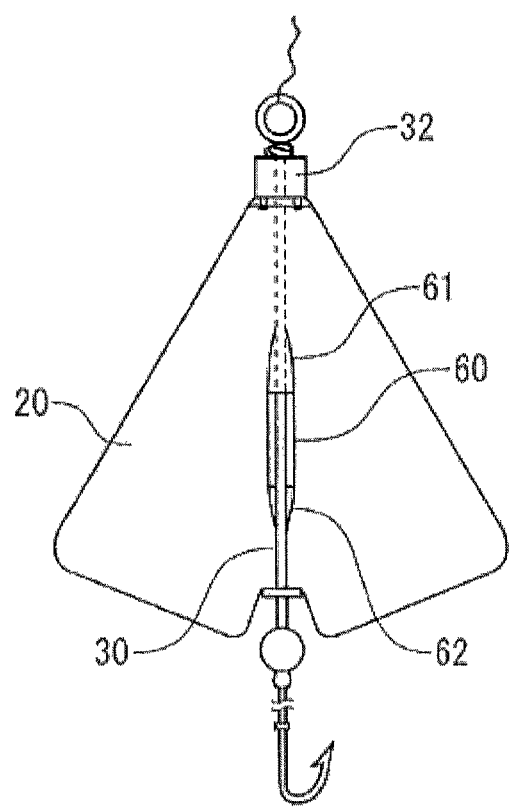
FIG. 2b is a plain view of the first embodiment of the present invention.

Next, when the angler starts casting, the propeller body 20 may start moving in the upward direction shown in FIG. 2, the rotary wings 21 may receive air resistance, and the propeller body 20 may start free rotation. Then, after the fish collecting device being cast go beyond the tip of the fishing rod, the fish collecting device may assume the position in which the hook side is oriented forward. That is, the fish collecting device may assume the position in which the lower side in FIGS. 2a and 2b is oriented forward, such that the propeller body 20 may receive resistance opposite to that it received when casting was started. Thus, the relative positional relationship between the propeller body 20 and the rotary shaft 30 may begin to change, and the propeller body 20 may move toward the rotation restricting portion 32 of the rotary shaft 30.

Then, the positional relationship between the propeller body 20 and the rotary shaft 30 may change from the first positional relationship (the first arrangement) shown in FIG. 2a to the second positional relationship (the second arrangement) shown in FIG. 2b. In the second positional relationship, the projections 50 provided on the rotation restricting portion 32 may be engaged with the holes 51 provided in the front end stopper 22 of the propeller body 20, such that the propeller body 20 may be prevented from free rotation with respect to the rotary shaft 30. Thus, the air resistance may be reduced and the fish collecting device can be cast to a larger distance.

As is obvious from FIGS. 1 and 2, the lure (the fish collecting device) is attached to the fish line 40 at the tip of the rotary shaft 30; therefore, even in the second positional relationship, the propeller body 20 may rotate to some degree in association with the fish line. However, the free rotation is restricted in association with the rotary shaft 30, and casting to a larger distance is possible.

After the fish collecting device enters the water, the angler reels up the fish line 40. Then, the rotary shaft 30 connected to the fish line 40 may move forward relative to the propeller body 20, and the propeller body 20 may move backward along the rotary shaft 30. The propeller body 20 and the rotary shaft 30 may assume again the first positional relationship shown in FIG. 2a. Thus, the propeller body 20 can rotate freely with respect to the rotary shaft 30. The propeller body 20 rotating may produce special sonic or visual stimulus that lures curious fishes.

Figure 3A:
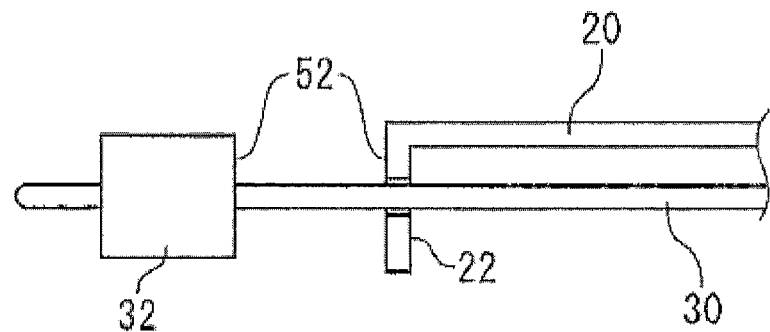
FIG. 3a is a sectional view of a variant of the first embodiment of the present invention.
Figure 3B:
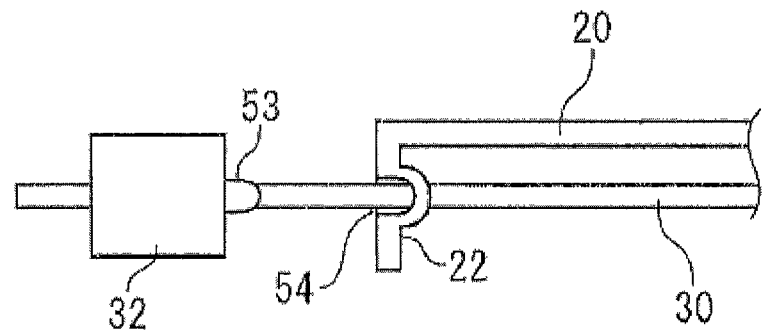
FIG. 3b is a sectional view of a variant of the first embodiment of the present invention.

FIGS. 3a to 3b show variants of engagement means for achieving the second positional relationship between the rotation restricting portion 32 and the propeller body 20 in the first embodiment. FIG. 3a shows that an end surface of the rotation restricting portion 32 facing the front end stopper 22 and an outer surface of the front end stopper 22 may be frictional surfaces 52. These frictional surfaces 52 may contact with each other so as to restrict the free rotation of the propeller body 20 with respect to the rotary shaft 30.

FIG. 3b shows that a ridge 53 is formed on the end surface of the rotation restricting portion 32 facing the front end stopper 22, and a groove 54 for receiving the ridge 53 is formed in the outer surface of the front end stopper 22, such that the ridge 53 can be engaged with the groove 54 so as to restrict the free rotation of the propeller body 20 with respect to the rotary shaft 30.

Figure 3C:
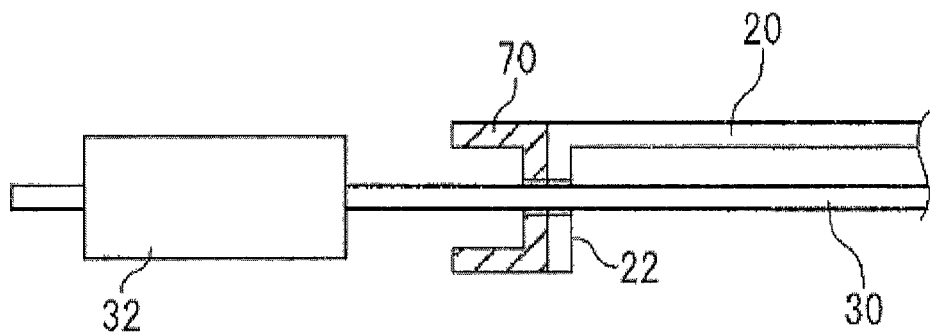
FIG. 3c is a sectional view of a variant of the first embodiment of the present invention.
Figure 4A:
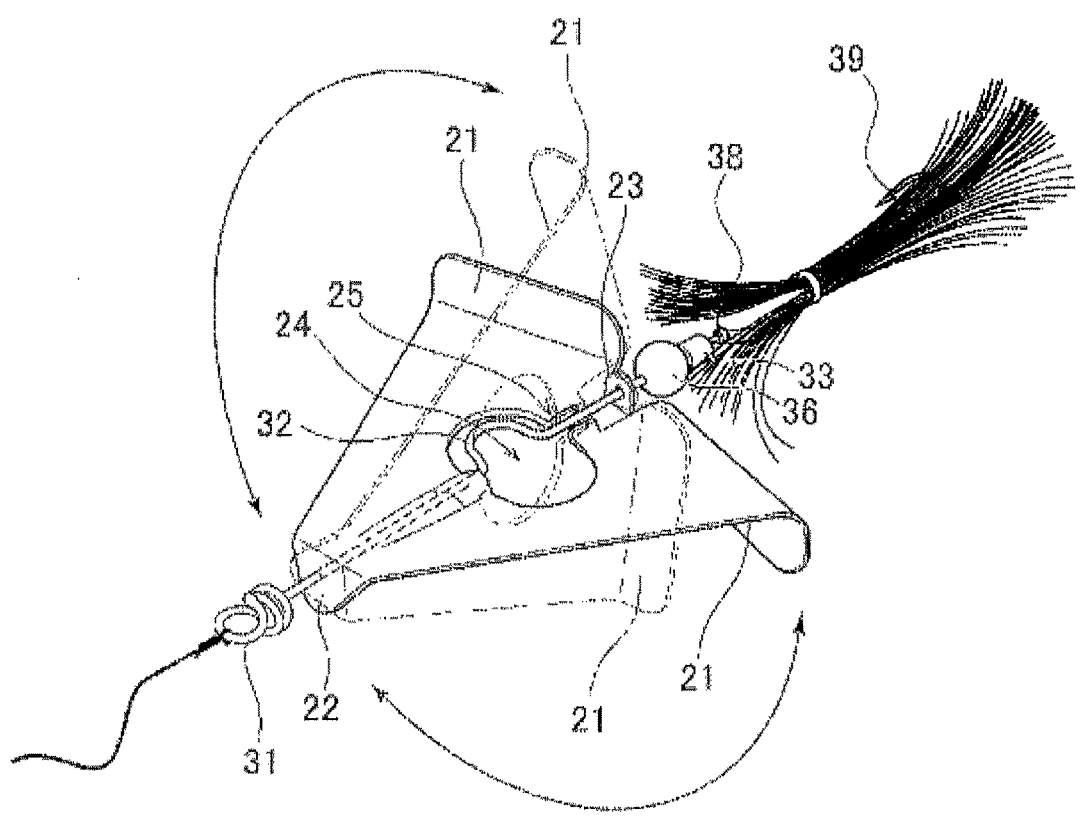
FIG. 4a is a plain view of a second embodiment of the present invention.
Figure 4B:
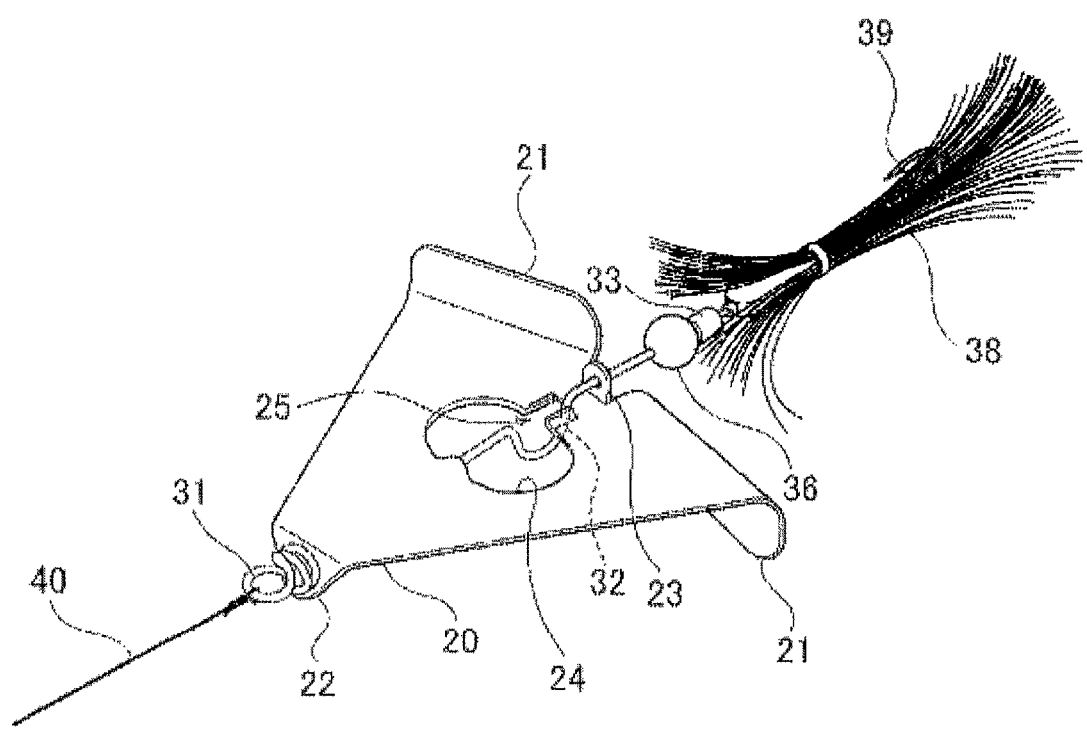
FIG. 4b is a plain view of the second embodiment of the present invention.

FIG. 3c shows that the rotation restricting portion 32 may have a polygonal outer shape; and on the outer surface of the front end stopper 22 may be provided a rotation-restricting-portion-receiving member 70 including a cavity capable of receiving the entirety or a part of the rotation restricting portion 32 and having a polygonal inner shape identical to the outer shape of the rotation restricting portion 32. The rotation-restricting-portion-receiving member 70 may be formed of a resin or metal and may be fixed on the outer surface of the front end stopper 22 via an adhesive. In this variant, the inner shape of the rotation-restricting-portion-receiving member 70 may be identical to the outer shape of the rotation restricting portion 32. However, these shapes may not necessarily be identical but may be different as long as the rotation is restricted. For example, it is possible that the outer shape of the rotation restricting portion 32 be square and the inner shape of the rotation-restricting-portion-receiving member 70 be hexagonal or octagonal Any engagement means other than those shown in FIGS. 3a to 3c can be employed as long as the rotation restricting portion 32 is engaged with the propeller body 20 such that the propeller body 20 is prevented from free rotation with respect to the rotary shaft 30.

FIGS. 4a to 8b show the second embodiment of the present invention. The difference of the second embodiment from the first embodiment is that the rotation restricting portion 32 may be formed by bending the middle portion of the rotary shaft 30 and a rotation space 24 for accepting the rotation restricting portion 32 may be formed in the middle portion of the propeller body 20.

As shown in FIGS. 4a to 5b, the rotary shaft 30, which may be formed of one piece of wire or one metal rod, may include the rotation restricting portion 32 in the axially middle portion thereof. The rotation restricting portion 32 may be formed by bending the middle portion of the rotary shaft into a semicircular shape. The rotation restricting portion 32 in this embodiment may be formed by bending the middle portion of the rotary shaft into a semicircular shape, and this shape is not limited to a semicircle but may also be a triangle or rectangle. Also, the rotation restriction portion 32 may be formed of a member separate from the rotary shaft 30 and may be fixed on the rotary shaft 30. The piece of wire as the rotary shaft should preferably have some degree of elasticity; and in the case where the rotation restricting portion 32 is formed by bending the rotary shaft, the wire should preferably be formed of such a material that the shape of the rotation restricting portion 32 may not readily be changed under a load and, even if it is changed, the rotation restricting portion 32 may readily recover its initial shape.

The propeller body 20 may have a rotation space 24 punched therein such that, during rotation of the propeller body 20, the rotation restricting portion 32 formed in the rotary shaft 30 does not contact the propeller body 20, and the propeller body 20 and the rotary shaft 30 freely rotate relative to each other. The rotation space 24 may have a circular or oval shape, which may have a diameter (D1) larger than the diameter (D2) of the rotation restricting portion 32.

The propeller body 20 may have a tapered cavity 61 formed by pressing and extending over a certain range from a central end of the rotation space 24. The tapered cavity 61 may prevent the propeller body 20 from contacting the rotary shaft 30, as in the first embodiment.

The propeller body 20 may have a rotation stopping groove 25 along a part of the rotation space 24 closer to the first stopper 33. The rotation stopping groove 25 may contact the rotation restricting portion 32 so as to prevent the propeller body 20 and the rotary shaft 30 from freely rotating relative to each other. The width of the rotation stopping groove 25 may be larger than the diameter of the rotary shaft 30 and smaller than the diameter (D2) of the rotation restricting portion 32, and the depth of the rotation stopping groove 25 may be smaller than the diameter (D2) of the rotation restricting portion 32. The numeral 31 denotes a second stopper which may also serve as a fish line connecting portion.

Figure 5A:
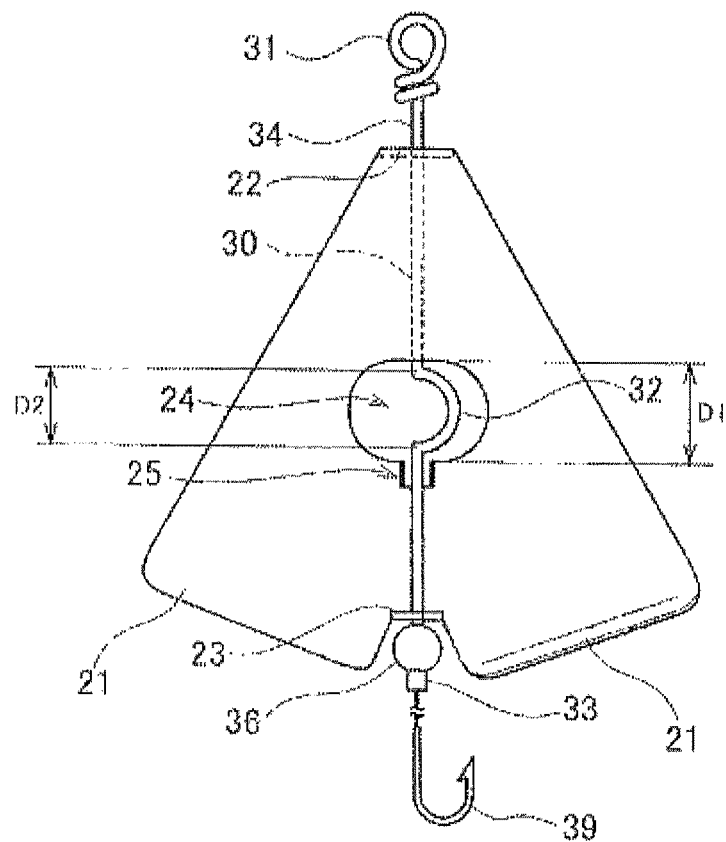
FIG. 5a is a plain view of the second embodiment of the present invention.
Figure 5B:
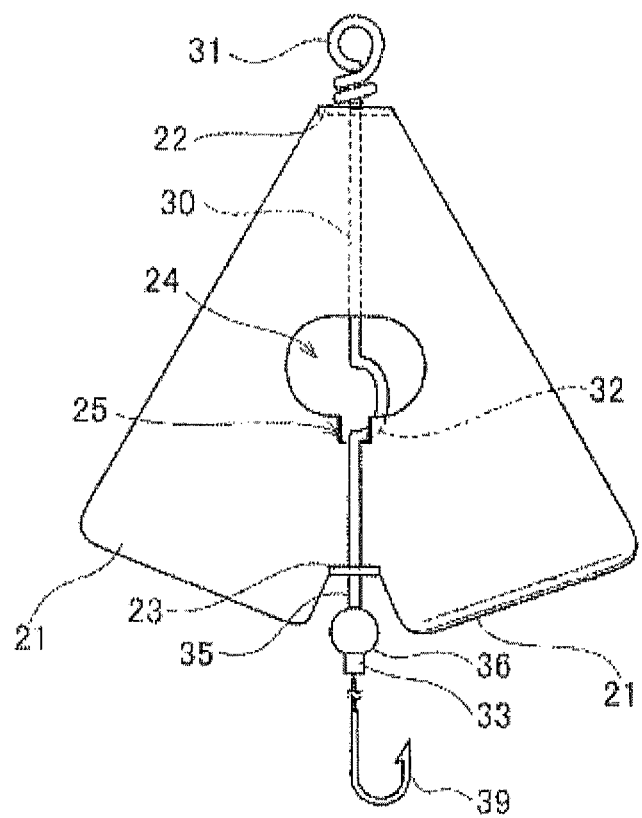
FIG. 5b is a plain view of the second embodiment of the present invention.

The operation of the fish collecting device according to the second embodiment is basically the same as that of the first embodiment, and detailed description thereof will be omitted. For the second embodiment, FIG. 5a shows the first positional relationship (the first arrangement) and FIG. 5b shows the second positional relationship (the second arrangement). In the second positional relationship (the second arrangement) of the second embodiment, the propeller body 20 can make about a half rotation (rotate by about 180°) with respect to the rotary shaft 30 and may not be fixed almost completely as in the first embodiment.

Figure 6:
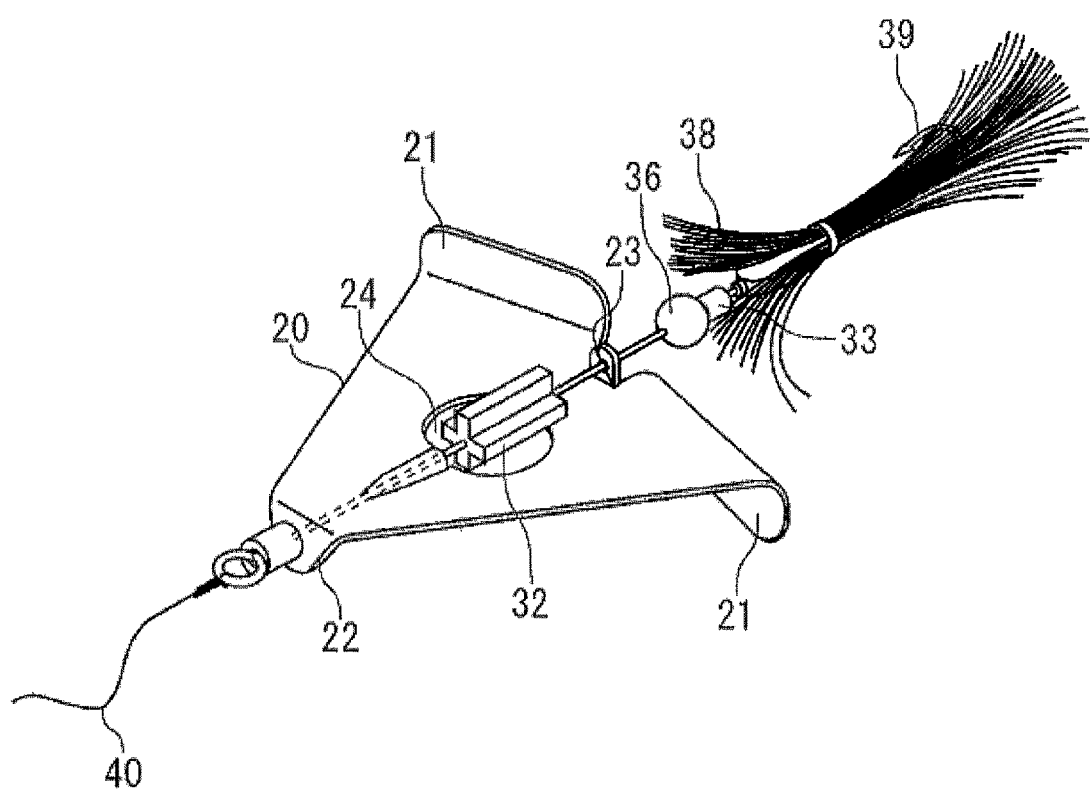
FIG. 6 is a perspective view of variant 1 of the second embodiment of the present invention.

FIG. 6 shows variant 1 of the second embodiment. The rotation restricting portion 32 of the variant 1 may be formed of a resin mold having a cross-shaped section and may be fixed on the rotary shaft 30. In this arrangement, one of the four ridges may enter the rotation stopping groove 25, while the two adjacent ridges projecting horizontally are placed on the plane of the propeller body 20, such that the propeller body 20 and the rotary shaft 30 are almost fixed to each other and thus the free rotation of the propeller body 20 can be restricted, as in the first embodiment. FIG. 6 shows the second positional relationship (the second arrangement).

Figure 7A:
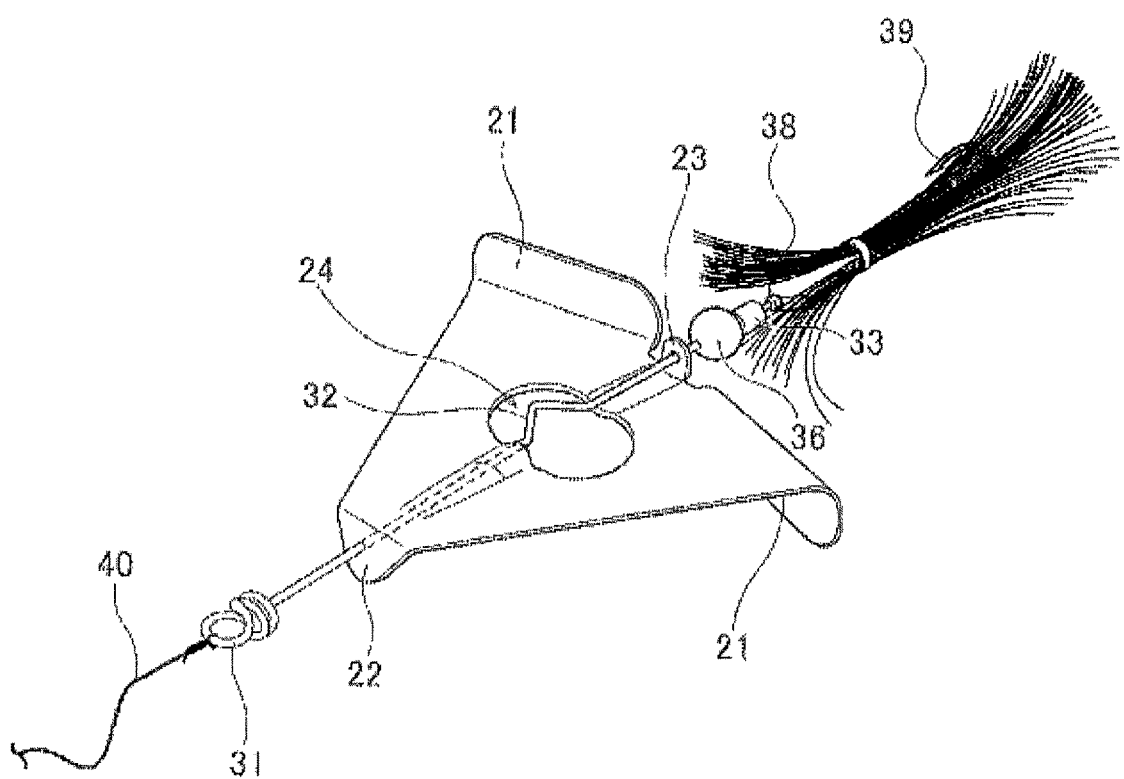
FIG. 7a is a perspective view of variant 2 of the second embodiment of the present invention.
Figure 7B:
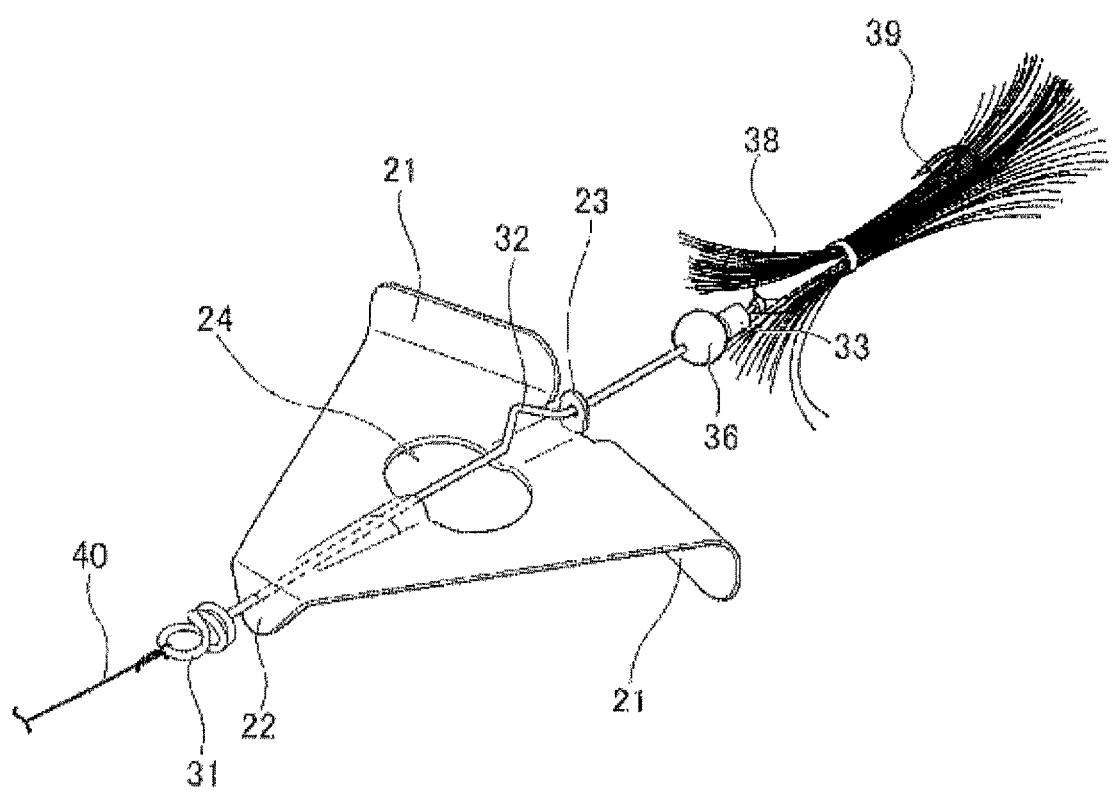
FIG. 7b is a perspective view of variant 2 of the second embodiment of the present invention.
Figure 8A:
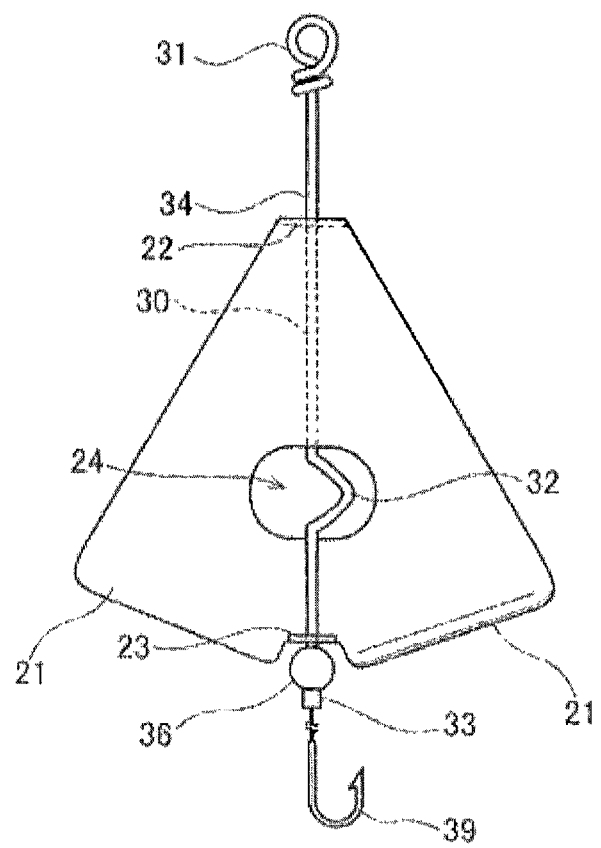
FIG. 8a is a plain view of variant 2 of the second embodiment of the present invention.
Figure 8B:
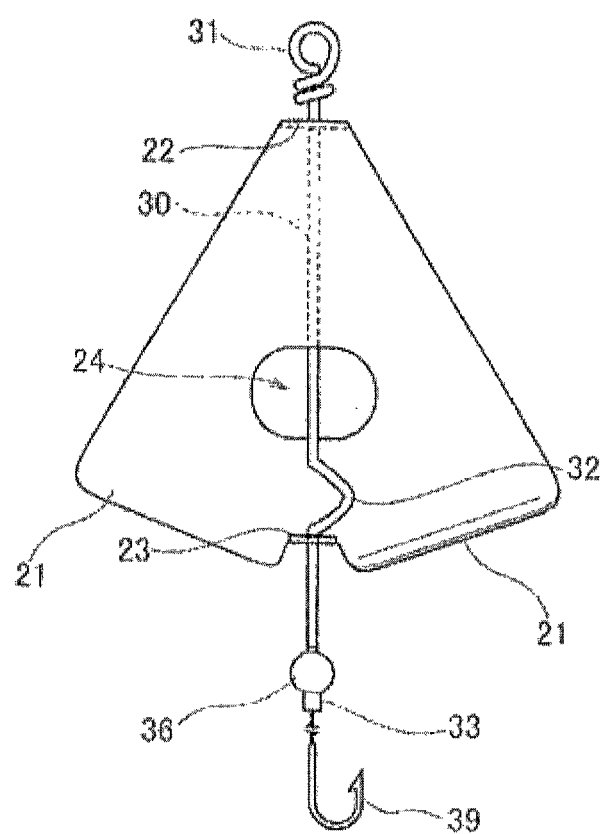
FIG. 8b is a plain view of variant 2 of the second embodiment of the present invention.
Figure 9:
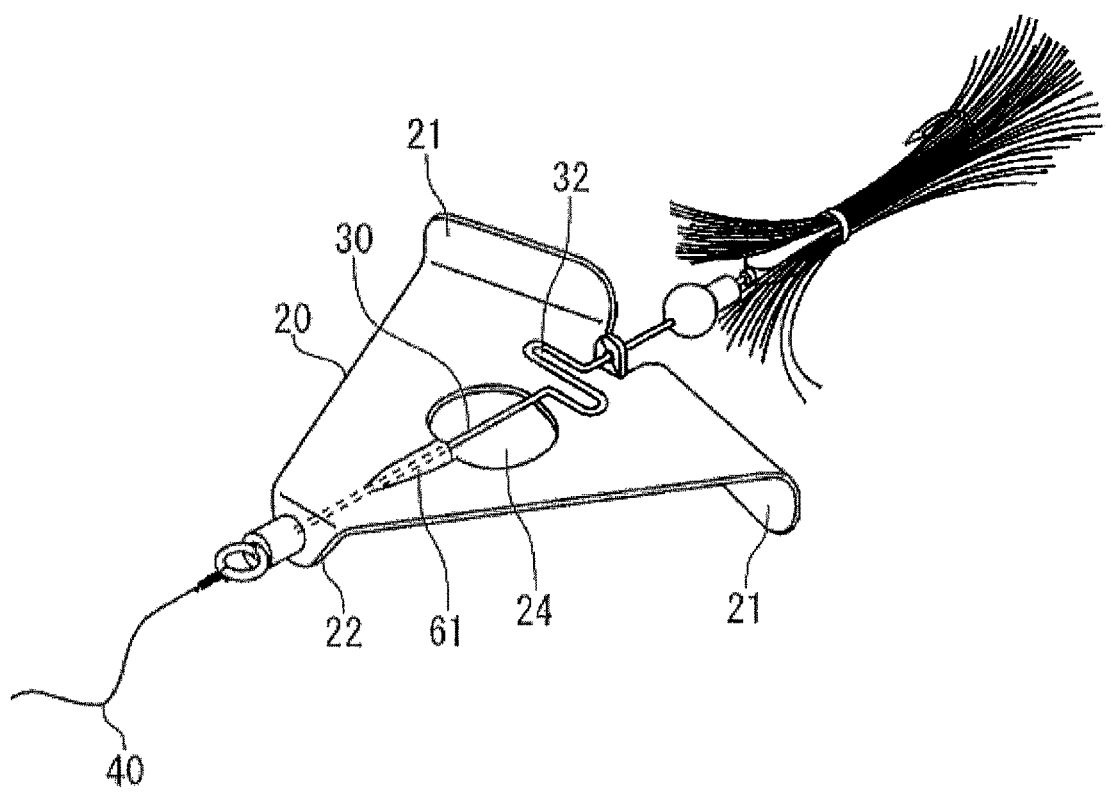
FIG. 9 is a plain view of variant 3 of the second embodiment of the present invention.
Figure 10A:
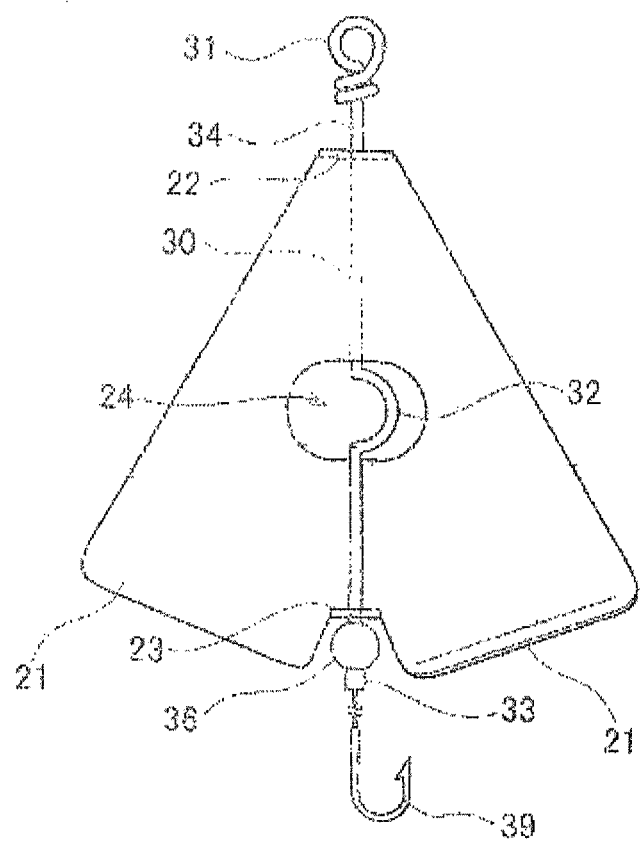
FIG. 10a is a plain view of variant 4 of the second embodiment of the present invention.
Figure 10B:
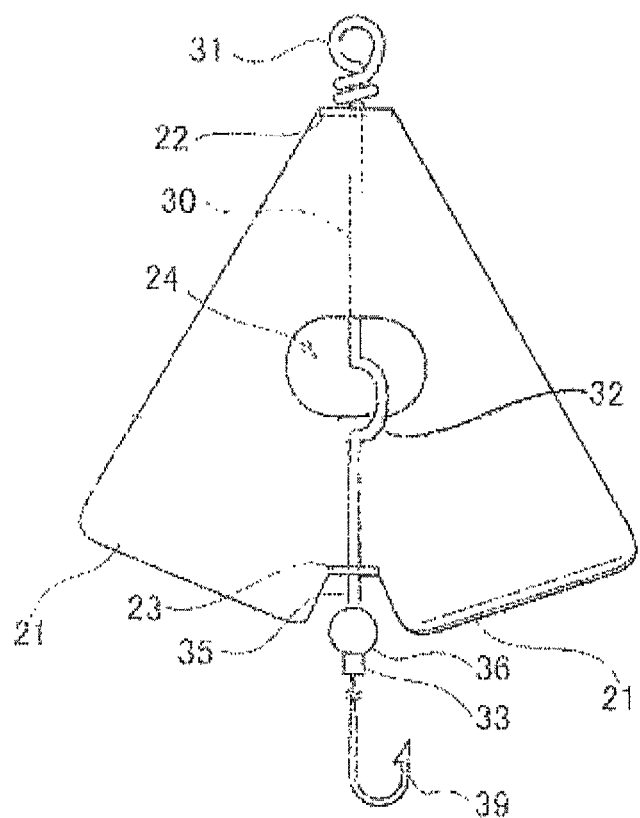
FIG. 10b is a plain view of variant 4 of the second embodiment of the present invention.

FIGS. 7a and 7b show variant 2 of the second embodiment; FIGS. 8a and 8b show variant 2 of the second embodiment; FIG. 9 show variant 3 of the second embodiment; and FIGS. 10a and 10b show variant 4 of the second embodiment. The variants 2 to 4 do not have a rotation stopping portion 25. The rotation restricting portion 32 may mount on the plane of the propeller body 20 so as to restrict the free rotation of the propeller body 20.

For the variant 2, FIG. 8a shows the first positional relationship (the first arrangement) wherein the propeller body 20 and the rotary shaft 30 can freely rotate relative to each other, and FIG. 8b shows the second positional relationship (the second arrangement) wherein the rotation restricting portion 32 may mount on the plane of the propeller body 20 and contact the rear end stopper 23, such that the propeller body 20 and the rotary shaft 30 cannot freely rotate relative to each other.

As shown in FIG. 8b, the rotation restricting portion 32 of the rotary shaft 30 may mount on and contact with the plane of the propeller body 20; therefore, the propeller body 20 cannot freely rotate with respect to the rotary shaft 30 (only about 180° rotation is possible as in the second embodiment). In the variant 2, the rotation restricting portion 32 may contact the rear end stopper 23 so as to set the second arrangement; therefore, it is not necessary to provide the second stopper 31 on the rotary shaft 30 so as to connect to the fish line 40. In the case where the second stopper 31 is not provided, the front end stopper 22 may serve only as a bearing for the rotary shaft 30 not as a stopper.

In the variant 2 as shown, the rotation restricting portion 32 may have a triangular shape so as to ensure that the rotation restricting portion 32 contact the rear end stopper 23. As in the second embodiment, the rotation restricting portion 32 may also have a semicircular or rectangular shape. The structure and operation of this variant may be basically the same as those of the first embodiment and the second embodiment; and detailed description thereof will be omitted.

FIG. 9 shows variant 3 of the second embodiment. The variant 3, which is based on the variant 2, may have the rotary shaft 30 bent such that the rotation restricting portion 32 projects in both horizontal directions. In this arrangement, the two projections are placed on the plane of the propeller body 20, such that the propeller body 20 and the rotary shaft 30 are almost fixed to each other and thus the free rotation of the propeller body 20 can be restricted, as in the first embodiment and the variant 1. FIG. 9 shows the second positional relationship (the second arrangement).

FIGS. 10a and 10b show variant 4 of the second embodiment. The variant 4 may not have the rotation stopping groove 25 as the rotation stopping portion employed in the second embodiment; and the restriction in the first arrangement and the second arrangement is achieved by contact between the front end stopper 22 and the rear end stopper 23 provided in the propeller body and the second stopper 31 and the spacer 36 provided on the rotary shaft 30.

It may also be possible that the first stopper 33 directly contact the rear end stopper 23 without the spacer 36 therebetween, as in the second embodiment. Further, it may also be possible that another spacer is provided between the second stopper 31 provided in the rotary shaft 30 and the front end stopper 22 provided in the propeller body. The structure and operation of this variant may be basically the same as those of the first embodiment and the second embodiment; and detailed description thereof will be omitted.

In the second embodiment and its variants 2 and 4, the propeller body 20 in the second positional relationship (the second arrangement) can make about a half rotation (about 180°), and thus is not almost fixed as in the first embodiment and the variants 1 and 3 of the second embodiment; but since the free rotation of the propeller body 20 is restricted, casting to a large distance is possible.

Figure 11:
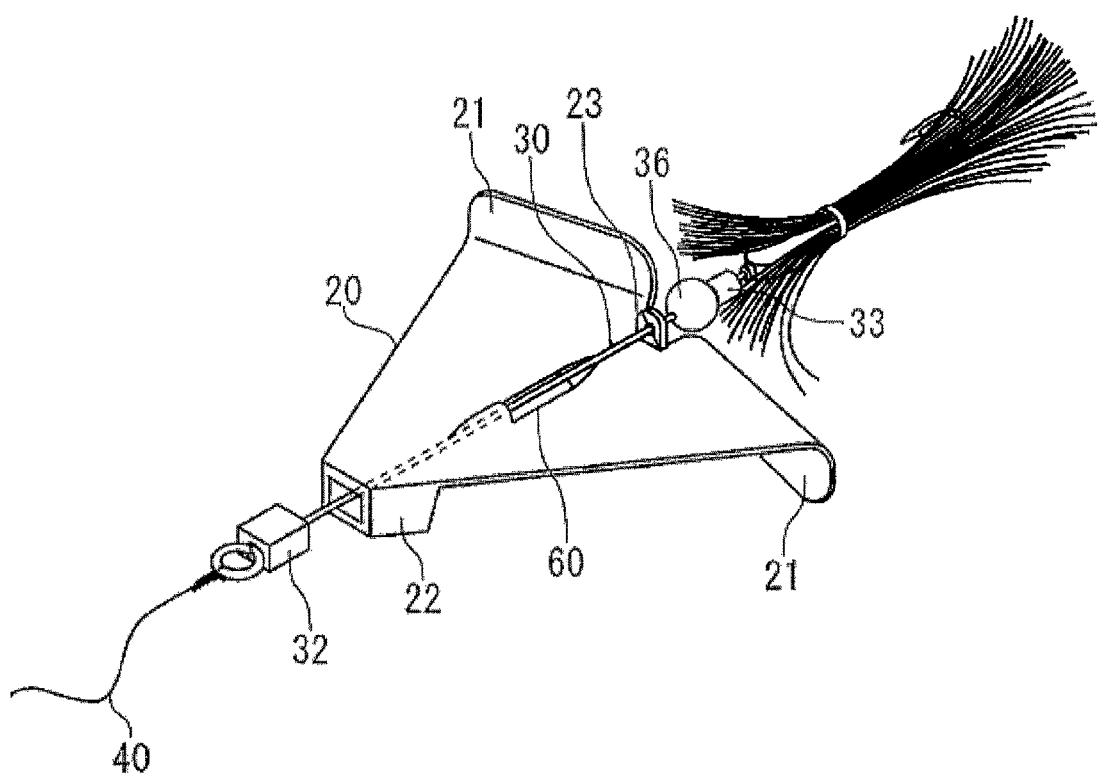
FIG. 11 is a perspective view of a third embodiment of the present invention.

FIG. 11 shows the third embodiment of the present invention. The third embodiment may be different from the first and the second embodiments in that the propeller body 20 is integrally formed of a resin; but it is the same as the first and the second embodiments in the basic structure and operation.

The propeller body 20 may be formed of a fiber-reinforced plastic including glass fibers or the like for increasing strength and weight. Further, in molding the resin, a metal plate may be embedded into the rotary wings of the propeller and molded together to increase the strength and achieve appropriate weight balance.

Integrally molding the propeller body 20 with a resin may enable mass production using a mold, and may also reduce production costs by reducing the number of parts and facilitate fabrication. More specifically, in implementing the structure of the first embodiment shown in FIG. 3c, the front end stopper 22 may be made thicker and have therein a cavity that can receive a part or the entirety of the rotation restricting portion having a polygonal section, instead of providing the rotation-restricting-portion-receiving member 70 separately formed and adhered to the front end stopper 22. FIG. 11 is the only example illustrated for the third embodiment; additionally, it may also be possible to implement the structure of the propeller body formed of one metal plate shown in FIGS. 1a to 11 as an integral resin mold.

In the above embodiments, the present invention is applied to fish collecting devices for a buzz bait. Moreover, the present invention can be applied to all the types of fish collecting devices including a rotary portion such as a propeller for collecting fishes, not only to those for a buzz bait.

What is claimed is:
1. A fish collecting device comprising:
   a propeller body including:
      one or more rotary wings;

a front end stopper formed at a front end of the propeller body and having a hole; and a rear end stopper formed at a rear end of the propeller body and having a hole, and a rotary shaft inserted through the holes and supporting the propeller body so as to be rotatable and movable in an axial direction, the rotary shaft including a rotation restricting portion, separate from the rear end stopper, for contacting the propeller body, wherein the propeller body and the rotary shaft relatively move between a first arrangement in which the propeller body freely rotates with respect to the rotary shaft and a second arrangement in which the rotation restricting portion contacts the propeller body and the rotary shaft is engaged with the propeller body such that the propeller body is unrotatable with respect to the rotary shaft, and wherein the rotation restricting portion is formed of an axial middle portion of the rotary shaft bent into an arc, triangular, or rectangular shape, wherein a rotation space, having a circular or oval shape, is provided in a middle portion of the propeller body, and wherein in the first arrangement of the propeller body and the rotary shaft, the axial middle portion of the rotary shaft is arranged in the rotation space, thereby allowing the propeller body to rotate freely without contacting the rotation restricting portion, and wherein the propeller body further includes a rotation stopping portion formed adjacent to the rotation space and capable of receiving a part of the rotation restriction portion.

2. The fish collecting device of claim 1 wherein the propeller body is formed of one metal plate, and each of the front end stopper and the rear end stopper is formed of a bent part of the metal plate.

3. The fish collecting device of claim 1 wherein the propeller body is formed of an integral molded resin.

4. The fish collecting device of claim 1 wherein the front end stopper and the rear end stopper are bent in opposite directions or in the same direction with respect to the propeller body.

* * * * *